United States Patent
Deng

(10) Patent No.: US 10,784,005 B2
(45) Date of Patent: *Sep. 22, 2020

(54) DEVICE FOR REMOVING FOREIGN OBJECTS FROM NUCLEAR REACTOR VESSEL

(71) Applicant: Sichuan Xingzhi Zhihui Intellectual Property Operation Co., Ltd., Chengdu, Sichuan (CN)

(72) Inventor: Liping Deng, Sichuan (CN)

(73) Assignee: Sichuan Xingzhi Zhihui Intellectual Property Operation Co., Ltd., Chengdu (CN)

( * ) Notice: Subject to any disclaimer, the term of this patent is extended or adjusted under 35 U.S.C. 154(b) by 421 days.

This patent is subject to a terminal disclaimer.

(21) Appl. No.: 15/838,399

(22) Filed: Dec. 12, 2017

(65) Prior Publication Data
US 2018/0358140 A1    Dec. 13, 2018

(30) Foreign Application Priority Data
Jun. 8, 2017 (CN) .......................... 2017 1 0428533

(51) Int. Cl.
| | | |
|---|---|---|
| G21D 1/04 | (2006.01) | |
| G21C 19/307 | (2006.01) | |
| G21C 19/20 | (2006.01) | |
| G21C 17/01 | (2006.01) | |

(52) U.S. Cl.
CPC .............. *G21D 1/04* (2013.01); *G21C 19/20* (2013.01); *G21C 19/307* (2013.01); *G21C 17/01* (2013.01)

(58) Field of Classification Search
CPC ...... G21C 17/01; G21C 17/08; G21C 19/207; G21C 19/20; G21C 19/307; B08B 5/04; B08B 9/08; G21D 1/04
USPC ............ 376/249, 260, 313; 15/327.1, 327.6; 134/21; 210/416.2
See application file for complete search history.

(56) References Cited

U.S. PATENT DOCUMENTS

| | | | | |
|---|---|---|---|---|
| 4,374,024 A | * | 2/1983 | Peloquin ................. | B05C 17/00 376/313 |
| 6,352,645 B1 | * | 3/2002 | Wilfong ................. | B01D 29/15 376/313 |

(Continued)

FOREIGN PATENT DOCUMENTS

CN           106486177 A      3/2017

*Primary Examiner* — Jack W Keith
*Assistant Examiner* — Daniel Wasil

(57) ABSTRACT

A device for removing foreign objects from nuclear reactor vessel includes a suction pipe; a suction opening structure disposed at a lower end of the suction pipe, an electric valve disposed at a connection of the suction pipe and the suction opening structure, a filter mesh and a suction pump sequentially located in the suction pipe and above the electric valve. The suction opening structure has a suction opening thereon, a water inlet of the suction pipe is communicated with the suction opening, and a water outlet of the suction pump is communicated with the outside space of the suction pipe though a drainage pipe. The device further includes a touch switch disposed on the filter mesh which is in operative connection with the electric valve. A foreign object impact force to the filter mesh triggers the touch switch to close which causes the electric valve to close.

10 Claims, 1 Drawing Sheet

(56) References Cited

U.S. PATENT DOCUMENTS

| | | | |
|---|---|---|---|
| 7,378,026 B1 * | 5/2008 | Thompson | E04H 4/1636 210/416.2 |
| 2011/0132405 A1 * | 6/2011 | Lowenstein | B08B 5/04 134/21 |
| 2012/0199161 A1 * | 8/2012 | Bijelovic | G21C 17/06 134/10 |

* cited by examiner

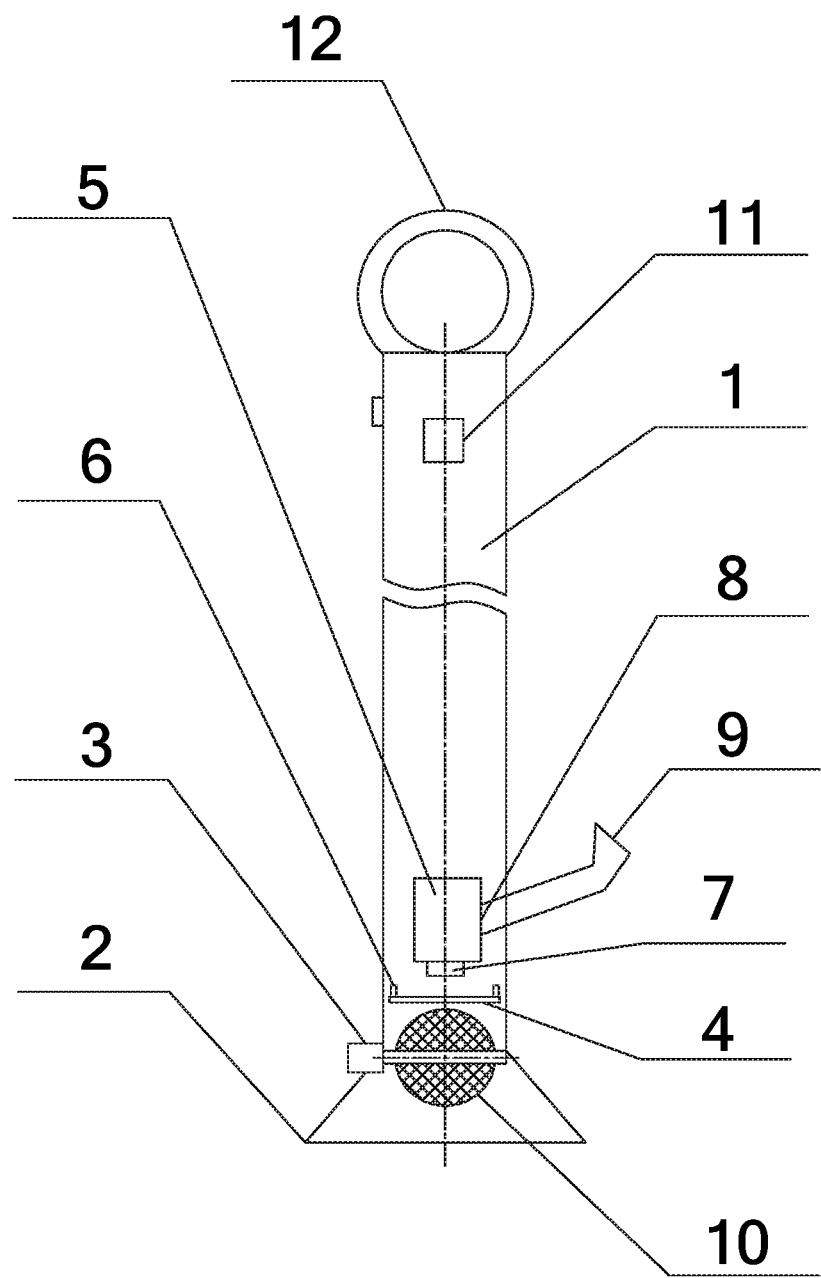

DEVICE FOR REMOVING FOREIGN OBJECTS FROM NUCLEAR REACTOR VESSEL

CROSS-REFERENCE TO RELATED APPLICATION

This application claims priority to Chinese patent application No. 201710428533.3 filed on Jun. 8, 2017, the contents of which are hereby incorporated by reference in their entirety.

FIELD OF THE INVENTION

The present invention relates to nuclear apparatus technology, and more particularly to a device for removing foreign matters in nuclear reactor vessel.

BACKGROUND OF THE INVENTION

Nuclear reactor is an apparatus used for starting, controlling and maintaining the nuclear fission or fusion chain reaction. The reaction rate of the nuclear reactor can be controlled precisely so that the energy of the nuclear reactor is released slowly for the use of people. There are various uses of the nuclear reactor, the most important use is to replace other fuel for producing heat as the steam electric power or the power for running the apparatuses such as aircraft carrier.

Reactor pressure vessel is one of the most important apparatuses in the nuclear reactor, due to equipment aging, vibration, impact, accidental falling of connecting bolts, nuts and tools during maintenance and other reasons, foreign matters are inevitably present at the bottom of the reactor pressure vessel. In the existing art, the foreign matters are taken out of the reactor pressure vessel by manpower, specifically, a diver wearing radiation-proof diving suit was sent into the reactor pressure vessel to take the foreign matters out of the reactor pressure vessel, which is costly and risky.

BRIEF SUMMARY OF THE INVENTION

Therefore, the present invention provides a device for removing foreign matters in nuclear reactor vessel to solve the problem that foreign matters cannot be safely and easily taken out of the nuclear reactor vessel.

According to an embodiment of the present invention, the device for removing foreign objects from nuclear reactor vessel comprises: a suction pipe capable of extending into the nuclear reactor vessel; a suction opening structure disposed at a lower end of the suction pipe, wherein the suction opening structure has a suction opening thereon, and an upper end of the suction opening structure is connected to the suction pipe; an electric valve disposed at a connection of the suction pipe and the suction opening structure; a filter mesh located in the suction pipe and above the electric valve; a suction pump located in the suction pipe and above the filter mesh; a touch switch disposed on the filter mesh; and a drainage pipe; wherein a water inlet of the suction pump is communicated with the suction opening of the suction opening structure, a water outlet of the suction pump is communicated with the outside space of the suction pipe though the drainage pipe, and the electric valve is controlled by the touch switch, specifically, the touch switch controls the electric valve to be opened and closed.

In another embodiment according to the previous embodiment, the electric valve comprises a spool with mesh structure.

In another embodiment according to the previous embodiment, the device for removing foreign matters in nuclear reactor vessel further comprises a controlling switch disposed on a top portion of the suction pipe.

In another embodiment according to the previous embodiment, the device for removing foreign matters in nuclear reactor vessel further comprises an operating handle disposed on the top portion of the suction pipe.

In another embodiment according to the previous embodiment, the drainage pipe comprises an upward outlet, preventing the foreign matters flowing with water.

In another embodiment according to the previous embodiment, the device for removing foreign matters in nuclear reactor vessel further comprises an alarm disposed on the top portion of the suction pipe, wherein the alarm is connected to and controlled by the touch switch, when the touch switch is triggered and closed, the alarm will inform the operator to check whether there are foreign matters sucked.

Compared to the existing art, the present invention has advantages and beneficial effects as follows:

1. The filter mesh and the suction pump are sequentially disposed in the suction pipe above the suction opening structure, so that the foreign matters in the nuclear reactor vessel can be adsorbed onto the filter mesh by the suction pump, an impact force to the filter mesh is generated when the foreign matters fall onto the filter mesh, and the touch switch disposed on the filter mesh is triggered and closed under the impact force, closing the electric valve. The device for removing foreign matters in nuclear reactor vessel in the present invention has a simple structure and is easy for operation, through which foreign matters can be taken out of the reactor vessel even though their specific location is not known.

2. The device for removing foreign matters in nuclear reactor vessel further comprises an alarm disposed on the top portion of the suction pipe, wherein the alarm is connected to and controlled by the touch switch, when the touch switch is triggered and closed, the alarm will inform the operator to check whether there are foreign matters sucked.

3. According to another aspect of the invention, the spool of the electric valve is of a mesh structure. Thus, when the electric valve is closed, it does not carry water flow and can prevent foreign matters falling off the filter mesh. Furthermore, a mesh-structure spool will not be basically subject to flow resistance when it is closed, and can be instantly closed when foreign matters touch the filter mesh, thus preventing foreign matters leaking outside of the mesh-structure spool. While normal electric valves are always used to completely shut down or control flow rate of fluid, the present invention only takes advantage of their rotation and control structure. Compared with the existing mechanical grasping structure, the present invention takes a mesh-structure spool to prevent foreign matters from being leaked, thereby facilitating the operation and holding of foreign matters.

For making the above and other purposes, features and benefits become more readily apparent to those ordinarily skilled in the art, the preferred embodiments and the detailed descriptions with accompanying drawings will be put forward in the following descriptions.

BRIEF DESCRIPTION OF THE DRAWINGS

The present invention will become more readily apparent to those ordinarily skilled in the art after reviewing the following detailed description and accompanying drawing, in which:

The FIGURE is a schematic view of the device for removing foreign matters in nuclear reactor vessel according to an embodiment of the present invention.

DETAILED DESCRIPTION OF THE PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

As shown in the FIGURE, a device for removing foreign matters in nuclear reactor vessel comprises a suction pipe 1 capable of extending into the nuclear reactor vessel; a suction opening structure 2 disposed at a lower end of the suction pipe 1, wherein the suction opening structure 2 has a suction opening at its lower end, an upper end of the suction opening structure 2 is connected to the suction pipe 1; an electric valve 3 disposed at a connection of the suction pipe 1 and the suction opening structure 2; a filter mesh 4 located in the suction pipe 1 and above the electric valve 3; a suction pump 5 located in the suction pipe 1 and above the filter mesh 4; a touch switch 6 disposed on the filter mesh 4; and a drainage pipe 9; wherein a water inlet of the suction pump 1 is communicated with the suction opening of the suction opening structure 2, a water outlet of the suction pump 2 is communicated with the outside space of the suction pipe 1 though the drainage pipe 9, the electric valve 3 is controlled by the touch switch 6, the electric valve 3 comprises a spool with mesh structure, the suction opening structure 2 is trumpet-shaped to form a flow channel for foreign matters suction, specifically, the diameter of the suction opening structure 2 increases from the upper end to the lower end thereof.

Further, a controlling switch 11 disposes on a top portion of the suction pipe 1 to control the suction pump 5 to be open or closed.

Further, an operating handle 12 disposes on the top portion of the suction pipe 1, operator is able to send the device into the nuclear reactor vessel and move it by operating the operating handle 12 so as to take out of the foreign matters.

Further, the drainage pipe 9 comprises an upward outlet, preventing the foreign matters flowing with water.

Further, an alarm disposed on the top portion of the suction pipe 1, wherein the alarm is connected to and controlled by the touch switch 6, when the touch switch 6 is triggered and closed, the alarm will inform the operator to check whether there are foreign matters sucked.

The filter mesh 4 and the suction pump 5 are sequentially disposed in the suction pipe 1 above the suction opening structure 2, so that the foreign matters in the nuclear reactor vessel can be adsorbed onto the filter mesh 4 by the suction pump 5, an impact force to the filter mesh 4 is generated when the foreign matters fall onto the filter mesh 4, and the touch switch 6 disposed on the filter mesh 4 is triggered and closed under the impact force, then the electric valve 3 is closed by the touch switch 6. The device for removing foreign matters in nuclear reactor vessel in the present invention has a simple structure and is easy for operation, through which foreign matters can be taken out of the reactor vessel even though their specific location is not known.

According to another aspect of the invention, the spool of the electric valve 3 is of a mesh structure. Thus, when the electric valve 3 is closed, it does not carry water flow and can prevent foreign matters falling off the filter mesh 4. Furthermore, a mesh-structure spool will not be basically subject to flow resistance when it is closed, and can be instantly closed when foreign matters touch the filter mesh 4, thus preventing foreign matters leaking outside of the mesh-structure spool. While normal electric valves are always used to completely shut down or control flow rate of fluid, the present invention only takes advantage of their rotation and control structure. Compared with the existing mechanical grasping structure, the present invention takes a mesh-structure spool to prevent foreign matters from being leaked, thereby facilitating the operation and holding of foreign matters.

For making the above and other purposes, features and benefits become more readily apparent to those ordinarily skilled in the art, the preferred embodiments and the detailed descriptions with accompanying drawings will be put forward in the following descriptions.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A device for removing foreign objects from nuclear reactor vessel, comprising:
   a suction pipe capable of extending into the nuclear reactor vessel;
   a suction opening structure disposed at a lower end of the suction pipe, wherein the suction opening structure has a suction opening thereon and an upper end of the suction opening structure is connected to the suction pipe;
   an electric valve disposed at a connection of the suction pipe and the suction opening structure;
   a filter mesh located in the suction pipe and above the electric valve;
   a suction pump located in the suction pipe and above the filter mesh; and
   a drainage pipe; wherein a water inlet of the suction pump is communicated with the suction opening of the suction opening structure, a water outlet of the suction pump is communicated with an outside space of the suction pipe though the drainage pipe, and the device further comprises a touch switch disposed on the filter mesh, wherein the touch switch is in operative connection with the electric valve, and wherein a foreign object impact force to the filter mesh triggers the touch switch to close which causes the electric valve to close which prevents escape of the foreign object from the device.

2. The device for removing foreign objects from nuclear reactor vessel according to claim 1, the electric valve comprising a spool with mesh structure.

3. The device for removing foreign objects from nuclear reactor vessel according to claim 1, further comprising a controlling switch disposed on a top portion of the suction pipe.

4. The device for removing foreign objects from nuclear reactor vessel according to claim 1, further comprising an operating handle disposed on the top portion of the suction pipe.

5. The device for removing foreign objects from nuclear reactor vessel according to claim 1, wherein the drainage pipe comprises an upward outlet, preventing the foreign objects flowing with water.

6. The device for removing foreign objects from nuclear reactor vessel according to claim 1, further comprising an alarm disposed on the top portion of the suction pipe, wherein the alarm is connected to and controlled by the touch switch, when the touch switch is triggered and closed, the alarm will inform the operator to check whether there are foreign objects sucked.

7. The device for removing foreign objects from nuclear reactor vessel according to claim 2, further comprising an alarm disposed on the top portion of the suction pipe, wherein the alarm is connected to and controlled by the touch switch, when the touch switch is triggered and closed, the alarm will inform the operator to check whether there are foreign objects sucked.

8. The device for removing foreign objects from nuclear reactor vessel according to claim 3, further comprising an alarm disposed on the top portion of the suction pipe, wherein the alarm is connected to and controlled by the touch switch, when the touch switch is triggered and closed, the alarm will inform the operator to check whether there are foreign objects sucked.

9. The device for removing foreign objects from nuclear reactor vessel according to claim 4, further comprising an alarm disposed on the top portion of the suction pipe, wherein the alarm is connected to and controlled by the touch switch, when the touch switch is triggered and closed, the alarm will inform the operator to check whether there are foreign objects sucked.

10. The device for removing foreign objects from nuclear reactor vessel according to claim 5, further comprising an alarm disposed on the top portion of the suction pipe, wherein the alarm is connected to and controlled by the touch switch, when the touch switch is triggered and closed, the alarm will inform the operator to check whether there are foreign objects sucked.

\* \* \* \* \*